RESTRICTED RANGE RADIO TRANSMITTING SYSTEM

Filed June 11, 1956 2 Sheets-Sheet 1

*INVENTOR.*
DONALD B. DANIEL
*BY*
Campbell, Brumbaugh, Freo & Graves
his *ATTORNEYS.*

April 18, 1961 D. B. DANIEL 2,980,793

RESTRICTED RANGE RADIO TRANSMITTING SYSTEM

Filed June 11, 1956 2 Sheets-Sheet 2

INVENTOR.
DONALD B. DANIEL

BY

Campbell, Brumbaugh, Free & Graves his ATTORNEYS.

2,980,793
Patented Apr. 18, 1961

2,980,793

RESTRICTED RANGE RADIO TRANSMITTING SYSTEM

Donald B. Daniel, Sylmar, Calif., assignor to Electronic Safety Engineering Company, Oklahoma City, Okla., a company of Oklahoma Filed June 11, 1956, Ser. No. 590,777
5 Claims. (Cl. 250—4)

This invention relates to restricted range radio transmitting systems and, more particularly, has reference to a radio system useful in transmitting signals locally to vehicles.

An increasing number of automobiles are being equipped with radio receivers and therefore, it has become desirable to transmit a variety of programs to such vehicles along roadways of extended length. Unless radio transmission to moving vehicles can be achieved with low power transmitters having a highly restricted range, excessive interference with nearby receivers will result. Therefore, it is necessary that the transmitted signal strength be very low and accordingly, the transmitting antenna in the present instance must at all times be proximate to the automobile radio receiver.

Prior systems for providing radio transmission along extended roadways generally utilized overhead wire antennas which proved unsatisfactory for obvious reasons. In addition, such systems were subject to the disadvantage that the signal strength varied appreciably along the roadway to the extent that the automatic volume control circuits of the radio receivers could not compensate sufficiently to insure satisfactory reception. Furthermore, such prior systems failed to make provision for automatically setting the signal strength of the field adjacent the roadway to maintain it at a proper level to comply with the applicable governmental regulations.

Accordingly, it is an object of the present invention to provide for the radiation of substanially constant strength radio signals along an extended length of roadway and restricted to the vicinity of such roadway.

It is another object of the invention to provide a system having the above characteristics in which the signal strength is automatically monitored.

These and further objects of the invention are accomplished by embedding a suitable transmission line antenna in substantially the center of a roadway and extending along its length, the transmission line antenna being suitably coupled to a radio transmitter. It is advantageous to provide a radio receiver adjacent to the roadway for monitoring the transmitted signals, such receiver being coupled to the radio transmitter for controlling the strength of the transmitted energy.

In one embodiment of the invention, the signal strength along the roadway is held uniform by the use of a two conductor transmission line antenna in which the spacing between the conductors and their width is appropriately varied.

In another embodiment of the invention, the signal strength along the roadway is maintained at a constant level by varying the depth that the transmission line antenna is embedded in the roadway.

These and further objects and advantages of the present invention will be more readily understood when the following description is read in connection with the accompanying drawings in which.

Figure 1:
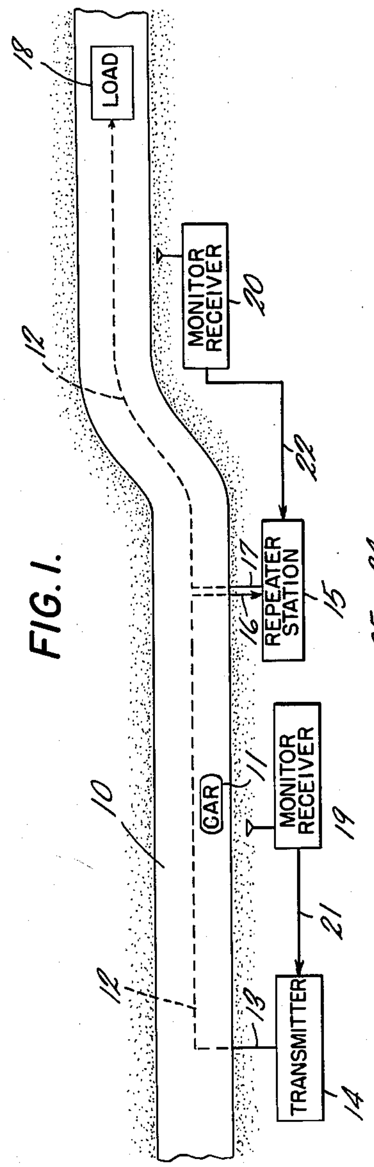
Figure 1 is a schematic circuit diagram in block form of a restricted radio communication system constructed in accordance with the principles of the present invention.

Referring to an illustrative embodiment of the present invention in greater detail with particular reference to Figure 1, an extended roadway 10 traveled by radio receiver carrying vehicles 11 is provided with an embedded transmission line antenna 12 extending substantially along its center. The details of embedding the transmission line 12 and its actual construction will be discussed hereinafter.

A cable 13 couples a radio transmitter 14 to the transmission line antenna 12. In addition, repeater stations 15 may be located along the roadway 10 and coupled to the transmission line antenna 12 by cables 16 and 17, the stations 15 being spaced to strengthen the signal level to a selected level along the roadway 10. A terminating load 18 matching the characteristic impedance of the transmission line 12 dissipates the energy it receives without reflections to preclude standing waves on the line antenna. Such load may comprise a suitably valued resistor incorporated in the transmisison line.

Monitor radio receivers 19 and 20 may be coupled by cables 21 and 22 to control the output power of the transmitter 14 and repeater station 15, respectively, in order to maintain the signal level along the roadway at a selected value. Of course, the cables 21 and 22 could be replaced by other coupling means such as microwave links.

It is a physical characteristic of transmission lines that a portion of the electromagnetic energy propagated along the line is lost as heat (dissipation loss) and another portion of the energy is lost by radiation. In a conventional line, these losses are a constant function of the energy at a given point. In the present invention, transmission lines function as antennas and are arranged to provide an increasing percentage of radiation loss of the propagated energy with increased distance from a transmitter while the characteristic impedance of the line is held constant. In addition, such transmission line antenas have minimum reaction to changing conductivity of adjacent semiconductive material.

Figure 2:
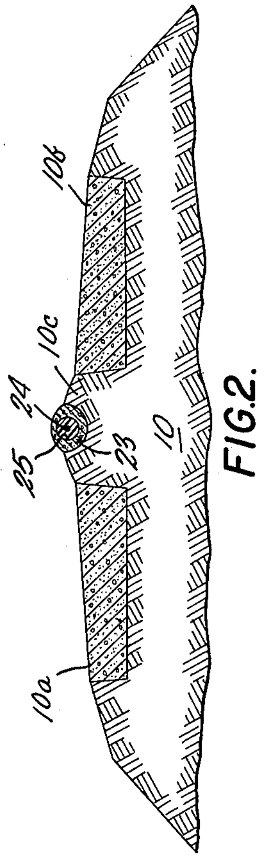
Figure 2 is a sectional view of a roadway and transmission line antenna in accordance with the present invention.

One particular form which the roadway 10 and transmission line antenna 12 may take is illustrated in Figure 2 in which a divided roadway formed of strips 10*a* and 10*b* of asphalt or concrete, for example, are separated by an unsurfaced center island 10*c*. A hollow and weatherproof cement enclosure 23 embedded in the center strip 10*c* carries a transmission line antenna 24 surrounded by insulation 25. The weather resistant enclosure 23 around the conductor 24 is necessary to stabilize the effects of changing ground conductivity with changing climatic conditions.

In order to provide for a uniform field along the roadway 10 with the arrangement of Figure 2, the insulation 25 may be surrounded by a special type braided wire to form a coaxial type line. At a point near the transmitter 14 the braid has a relatively large number of wires to provide a relatively efficient shield for the unattenuated energy being propagated along the line antenna 24. As the line extends from the transmitter 14, the number of wires in the braid may be decreased to weaken the shielding and permit increased leakage to thus maintain the external radiated field relatively constant.

Figure 3:
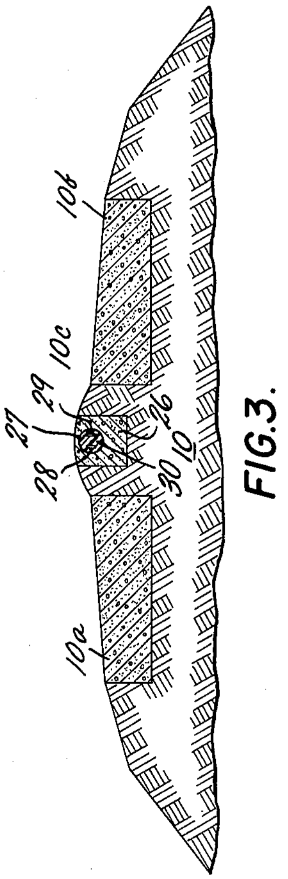
Figure 3 is a sectional view similar to Figure 2 illustrating a modified transmission line antenna in accordance with the invention.

Examining another embodiment of the invention with reference to Figure 3, the graded roadway 10 is similar to that of Figure 2 and comprises a divided highway with the strips 10*a* and 10*b* and the center island 10*c*. However, in this instance a weather resistant strip 26 formed, for example, of concrete carries a two conductor transmission line 27 formed by conductors 28 and 29 embedded in insulating material 30. The transmission line 27 is illustrated in greater detail in Figures 4 and 5 and is constructed to provide constant strength signals along the roadway 10.

Figure 4:
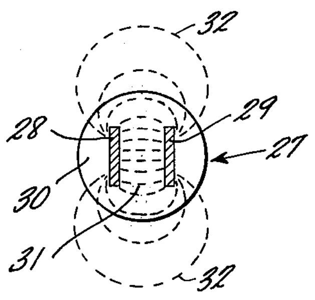
Figure 4 is a diagrammatic view in section of the transmission line antenna illustrated in Figure 3 taken at the end adjacent the radio transmitter.

More particularly, the cross-section of the transmission line 27 shown in Figure 4 is taken at a point adjacent to the transmitter 14 (Figure 1) in the roadway 10. At this point, the width of the conductors 28 and 29 in planes perpendicular to the roadway 10 is very large in relation to their thickness and approximates the dimension of the distance between them. Accordingly, the field between the conductors 28 and 29 established by the energy propagated along the transmission line 27 and indicated by the broken lines 31 is relatively strong and confined primarily between these conductors, the radiated field represented by broken lines 32 being of lesser strength.

Figure 5:
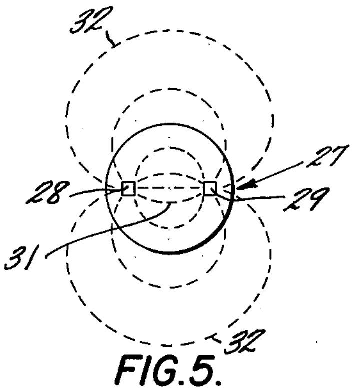
Figure 5 is a view similar to Figure 4 taken at the other end of the transmission line remote from the transmitter.

Referring next to Figure 5, this cross-section of the transmission line 27 has been taken at a point remote from the transmitter 14 and nearer to the repeater station 15 or terminating load 18 (Figure 1). Therefore, the conductors 28 and 29 are formed to have about the same width and thickness and the distance between them is somewhat greater than that shown in Figure 4. As a consequence, the field 31 confined between the conductors 28 and 29 is relatively weak when compared with the externally radiated field 32.

The transmission line 27 is formed with a cross-section as shown in Figure 4 adjacent to the transmitter 14 and has continuously varying dimensions as it extends to the repeater station 15 or the load end of the transmission line, these dimensions eventually changing to those of Figure 5. In addition, the dimensions are varied so that the impedance of the line antenna 27 remains constant. Of course, the external field would gradually increase along the line antenna 27 if transmission line losses were disregarded. However, such losses normally reduce the external or radiated field and accordingly, the transmission line 27 compensates these losses and provides an external field of constant strength along its length even though the total propagated energy is decreasing with distance from the transmitter 14.

Figure 6:
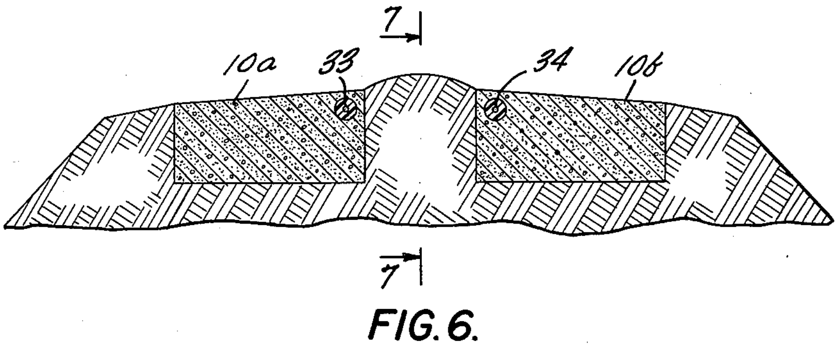
Figure 6 is a further sectional view of the roadway and transmission line in which a pair of conductors are spaced to provide radio signals in a restricted range.
Figure 7:
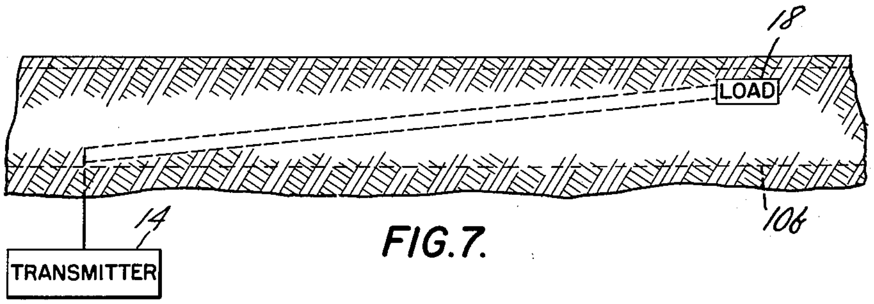
Figure 7 is a longitudinal section of the system illustrated in Figure 6 taken on the view line 7—7 showing one manner in which the signal strength along the roadway may be maintained substantially constant.

Another arrangement for a two-conductor transmission line antenna is a divided highway similar to those shown in Figures 2 and 3 is illustrated in Figures 6 and 7. In this instance, insulated conductors 33 and 34 are embedded in the strips 10*a* and 10*b*. A portion of the field established between these conductors by the energy propagated therealong extends above the surface of the roadway 10. In order to provide for a constant strength signal along the roadway 10, the conductors 33 and 34 may be embedded in the strips 10*a* and 10*b* at varying depths, the depth being greatest adjacent to the transmitter 14 and tapering towards the surface to the load 18, as shown in Figure 7. The deeper the transmission line antenna formed by the conductors 33 and 34, the greater the losses between the line and the surface. If the transmission line antenna is tapered towards the surface at a rate such that the propagation losses to the surface plus the propagation losses down the line are a constant, when the field above the roadway 10 will be uniform. Of course, such variable depth embedding may also be used with the transmission line antenna 24 of Figure 2.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. Apparatus for providing restricted range radio signals along an extended roadway comprising a radio transmitter, a transmission line antenna embedded in the roadway and extending along its length, means coupling the transmitter to the antenna, the transmission line antenna including a pair of spaced apart conductors, each of said conductors adjacent to the transmitter having a relatively large width in relation to its thickness, said width continuously decreasing while the conductor spacing is increasing along the transmission line as it extends from the transmitter to maintain the signal strength substantially uniform along the roadway.

2. Apparatus as defined in claim 1 wherein said uniform signal strength maintaining means comprises a pair of spaced apart conductors, each of said conductors adjacent to the transmitter having a relatively large width in relation to its thickness, said width continuously decreasing while the conductor spacing is increasing along the transmission line as it extends from the transmitter.

3. In a restricted range radio system, an extended two conductor transmission line antenna comprising means spacing the conductors apart in a horizontal plane, said spacing increasing along the length of the line antenna, each of the conductors tapering from a relatively large width in relation to its thickness in a vertical plane at the initial portion of the line towards a decreasing width as the conductor spacing increases.

4. Apparatus for providing restricted range radio signals along an extended roadway comprising a radio transmitter, a transmission line antenna of substantially constant characteristic impedance and terminated by a nonreflecting load, said line antenna being encased by weatherproof material and embedded in substantially the center of the roadway and extending along its length, means coupling the transmitter to the antenna, the transmission line antenna including a pair of conductors spaced apart along a plane substantially parallel to the roadway, each of said conductors adjacent to the transmitter having a relatively large width in a plane perpendicular to the roadway in relation to its thickness, said width continuously decreasing while the conductor spacing is increasing along the transmission line as it extends from the transmitter to maintain the signal strength substantially uniform along the roadway.

5. Apparatus as defined in claim 4 wherein said uniform signal strength maintaining means comprises a pair of conductors spaced apart along a plane substantially parallel to the roadway, each of said conductors adjacent to the transmitter having a relatively large width in a plane perpendicular to the roadway in relation to its thickness, said width continuously decreasing while the conductor spacing is increasing along the transmission line as it extends from the transmitter to provide a substantially uniform radiated field adjacent to the line.

References Cited in the file of this patent

UNITED STATES PATENTS

| | | |
|---|---|---|
| 874,411 | Leblanc | Dec. 24, 1907 |
| 1,220,005 | Rogers et al. | Mar. 20, 1917 |
| 1,349,104 | Rogers | Aug. 10, 1920 |
| 1,562,961 | Heising | Nov. 24, 1925 |

(Other references on following page)

UNITED STATES PATENTS

| | | |
|---|---|---|
| 1,843,288 | Leonard | Feb. 2, 1932 |
| 1,959,407 | Bruce | May 22, 1934 |
| 2,122,145 | Kear et al. | June 28, 1938 |
| 2,159,637 | Royden | May 23, 1939 |
| 2,183,717 | Keall | Dec. 19, 1939 |
| 2,267,268 | Burrows | Dec. 23, 1941 |
| 2,407,417 | Halstead | Sept. 10, 1946 |
| 2,478,133 | Shanklin | Aug. 2, 1949 |
| 2,510,066 | Busignies | June 6, 1950 |
| 2,530,418 | Alvarez | Nov. 21, 1950 |
| 2,678,998 | Young | May 18, 1954 |

OTHER REFERENCES

Publication I: "Radio Engineers Handbook" by Terman, 1st edition, pages 770–771, 772, 774, and 796.